United States Patent [19]
Tokarchuk et al.

[11] 4,016,898
[45] Apr. 12, 1977

[54] MEANS FOR SUPPRESSING CAVITATION IN A HIGH PRESSURE RELIEF VALVE

[75] Inventors: E. Stephen Tokarchuk, Warren; Gaylord O. Ellis, Rochester, both of Mich.

[73] Assignee: Sperry Rand Corporation, Troy, Mich.

[22] Filed: May 27, 1975

[21] Appl. No.: 581,016

[52] U.S. Cl. ............................................. 137/115
[51] Int. Cl.² ...................................... G05D 11/00
[58] Field of Search ................... 137/115, 469, 473

[56] References Cited
UNITED STATES PATENTS
3,832,095  8/1974  Akima et al. ................ 137/115 X

*Primary Examiner*—William R. Cline
*Attorney, Agent, or Firm*—Theodore Van Meter

[57] ABSTRACT

The suppression of bubble formation and cavitation in the fluid passing through a high pressure relief valve is achieved by a back pressure valve in the relief valve discharge line. The back pressure valve has differential area pistons which maintain a back pressure of a fixed ratio to the high pressure at the relief valve inlet, this ratio being at least 1:3.

2 Claims, 1 Drawing Figure

U.S. Patent           April 12, 1977           4,016,898
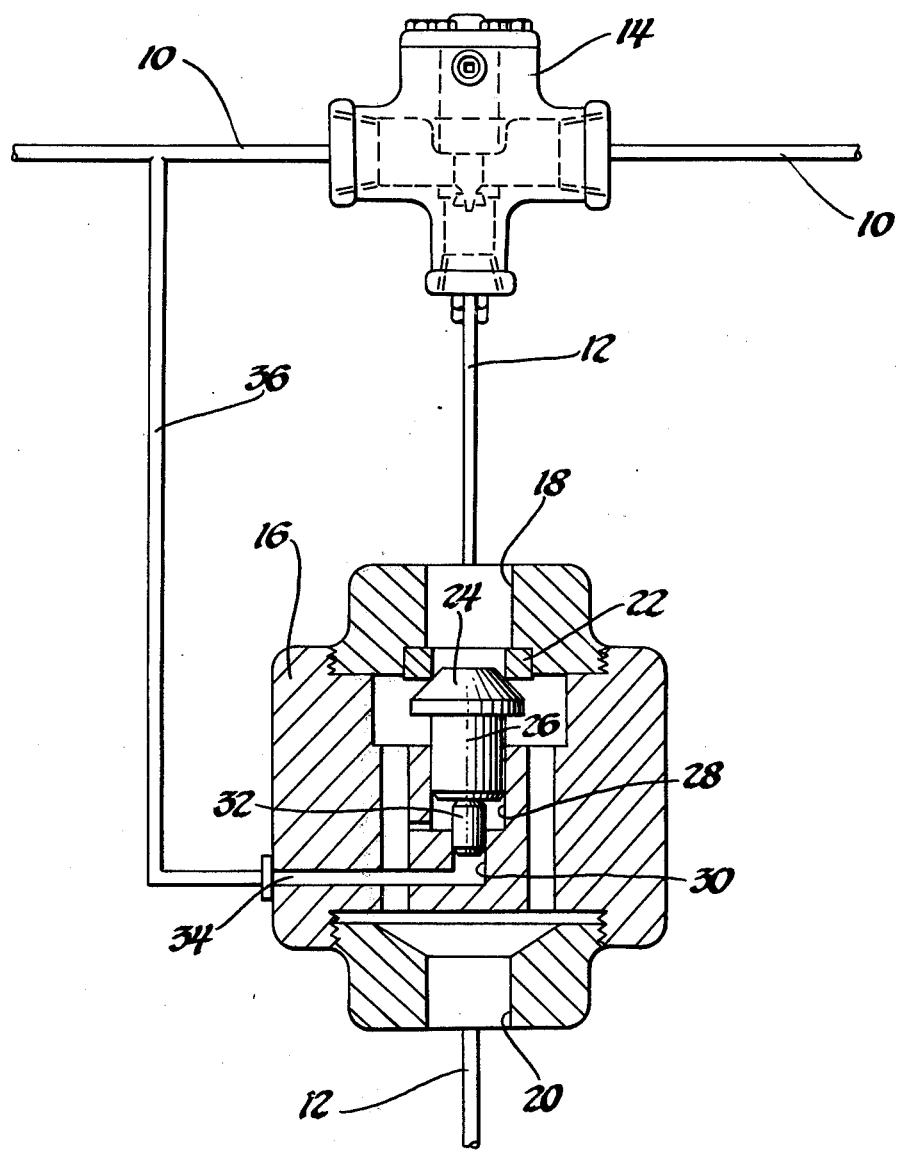

MEANS FOR SUPPRESSING CAVITATION IN A HIGH PRESSURE RELIEF VALVE

In hydraulic power transmission systems operating at high fluid pressures difficulties are encountered with erosion of the metal parts of certain valves such as high pressure relief valves due to the effects of bubble formation or cavitation in the fluid as it passes almost instantaneously from high operating pressure to low exhaust pressure, usually atmospheric or slightly above. The problem is aggravated in systems using certain fluids such as non-flammable water soluble mixtures and can be serious with petroleum fluids.

The present invention aims to eliminate or greatly reduce cavitation erosion in relief valves and other valves having a high pressure drop (the term relief valve being used hereafter to embrace not only the common relief valve, as such, but other valves which as ordinarily designed pass fluid with a very high pressure drop) by suppressing the formation of bubbles and cavitation in the fluid passing through the relief valve. If has been found that if a back pressure can be maintained at the relief valve discharge point which is at least ⅓ of the inlet pressure at the relief valve that bubble formation and cavitation are eliminated or very greatly reduced.

This result is achieved by the provision in a hydraulic power transmission system having a high pressure supply line and a low pressure exhaust line of the combination with a maximum pressure limiting relief valve and at least one back pressure valve between the relief valve and exhaust line, the back pressure valve having opposed differential piston areas exposed to supply line pressure and to the fluid passing from the relief valve toward the exhaust line.

IN THE DRAWING

The single FIGURE represents diagramatically a portion of a hydraulic power transmission system incorporating a preferred form of the present invention.

A supply line 10 and an exhaust line 12 represent portions of the hydraulic power transmission system containing a relief valve 14. The details of the valve per se and the form of the power transmission system are not parts of the present invention and are typified in the disclosure of the patent to Harry F. Vickers U.S. Pat. No. 2,043,453 of June 9, 1936 to which reference may be made for amplification of the present disclosure.

Connected in series in the exhaust line 12 is a back pressure valve 16 having its inlet 18 connected to the outlet of relief valve 14 and its outlet 20 connected to the continuation of the exhaust line 12. Within the valve 16 is a seat 22 normally closed by a poppet 24 carried by a piston 26 slidable in a cylinder 28.

The back pressure valve 16 has a smaller co-axial cylinder 30 within which is slidably mounted a piston 32 which abuts the lower end of the large piston 26. The cylinder 30 connects by a conduit 34 and a line 36 with the high pressure supply line 10. In order to maintain the desired back pressure in exhaust line 12, for example ⅓ the supply line pressure, the differential in areas between pistons 26 and 32 may be determined from the desired relationship between supply line Pressure $P_s$ and the intermediate Pressure $P_i$ at the outlet of the relief valve 14 for the relationship $3P_i = P_s - P_i$ then $4P_i = P_s$ or $P_s/P_i = 4$.

With this ratio or one somewhat lower, the formation of bubbles and cavitation in the fluid discharging from valve 14 when it is open will be suppressed. Furthermore, the same ratio will be maintained even though the pressure setting of relief valve 14 be changed from time to time. If with certain fluids it may be desirable to have a ratio between $P_s$ and $P_i$ such that $P_i$ is greater than ½ of $P_s$, the differential piston areas may be chosen accordingly and the cavitation problem which would otherwise occur at the back pressure valve 16 may be suppressed by the provision of an additional back pressure valve or valves in series in the exhaust line 12.

We claim:

1. In a hydraulic power transmission system having a high pressure supply line, an intermediate pressure line and a low pressure exhaust line, the combination with a maximum pressure limiting relief valve connected between the supply line and the intermediate pressure line of at least one back pressure valve between the intermediate pressure line and the exhaust line, the back pressure valve having an inlet connected to the relief valve outlet through the intermediate pressure line, and having an outlet connected to the exhaust line, with the intermediate pressure acting over a first operating area to open the back pressure valve, and means comprising a piston of smaller operating area exposed to supply line pressure and acting to partially oppose the opening force of the intermediate pressure to thereby supress cavitation in the fluid leaving the relief valve.

2. The combination defined in claim 1 wherein the ratio of differential areas is no more than 4:1.

* * * * *